3,256,224
VINYL HALIDE RESIN STABILIZERS COMPRISING BIS-(4 GLYCIDYLOXYPHENYL)-SULFONE AND METAL SALTS OF MONOCARBOXYLIC ACIDS
Armen G. Fisher, New Brunswick, N.J., assignor to Union Carbide Corporation, a corporation of New York
No Drawing. Filed Apr. 25, 1961, Ser. No. 105,295
15 Claims. (Cl. 260—23)

This invention relates to the heat-stabilization of halogen containing vinylidene resins. More particularly, this invention relates to halogen containing vinylidene resin compositions which are heat-stabilized by a bis-(4-glycidyloxyaryl)-sulfone.

Halogen containing vinyliden resins, for example, resins formed from monomers having the formula:

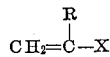

wherein X is a halogen, i.e., chlorine, bromine, iodine or fluorine and R is hydrogen or halogen as defined for X, have found wide utility in the plastics industry as materials from which can be fabricated various shaped structures. Such resins, which include vinyl chloride homopolymers and copolymers can be formed into such shaped structures as tubing which can be used as conduits, and as protective sheathing; and as self-sustaining film which can be used to package such articles as toys and the like.

Generally, in the production of shaped structures from halogen containing vinylidene resins and compositions based thereon, the materials are processed through such apparatus as calenders, injection molding machinery, extruders and the like, from whence these materials emerge in the desired shape, while they are in the "melt" state. In the "melt" state, the halogen containing resins and compositions based thereon, are at relatively high temperatures, usually on the order of about 150° C. to about 180° C. and their behavior is similar to that of viscous liquids. When in the "melt" state, the resins and the resin compositions, for obvious reasons, are relatively easy to process. For example, in those instances wherein the materials are being extruded while in their "melt" state, the power requirements necessary for forcing the materials through the extruder are of such a low order of magnitude that conventional low pressure extruders can be employed. This is an important consideration from an economic standpoint in that the use of high pressure extruders adds significantly to the overall cost of producing extruded structures.

Attendant with the relatively high temperatures at which halogen containing vinylidene resins and halogen containing vinylidene resin compositions are processed, however, is the problem of thermal deterioration of the resins. Deterioration is initially manifested by a discoloration of the materials which progresses through a yellow color to an orange color and finally to a black or brown color. When attaining a brown or black color, the resins have reached substantially complete deterioration and the physical properties of the resins and of compositions containing these resins, for all practical purposes, have been completely degraded.

Deterioration of halogen containing vinylidene resins has been generally attributed to the resins' inherent instability at relatively high temperatures due to dehydrohalogenation and subsequent oxidation. At relatively high temperatures, it is believed that hydrogen halide is eliminated from the resins and the hydrogen halide, so split off, catalyzes an oxidative attack on the unsaturated linkages of the resins, the unsaturated linkages being formed as a result of the dehydrohalogenation.

The deterioration problem becomes more acute when halogen containing vinylidene resins and compositions containing these resins are heated in iron apparatus. The hydrogen halide eliminated from such resins at the relatively high temperatures at which such resins and resin compositions are processed, reacts with the iron surface of the apparatus to form ferric halide. Ferric halide catalyzes the oxidative attack on the unsaturated linkages of the resin even more strongly than hydrogen halide.

In order to prevent thermal deterioration and thereby allow halogen containing vinylidene resins and compositions based thereon to be safely processed at relatively high temperatures and for relatively long periods of time at these temperatures, various compounds have been proposed as additives for the purpose of heat-stabilizing these materials.

Of the various heat-stabilizers which have been proposed, 2,2-bis-(4-glycidyloxyphenyl)-propane in combination with a metal salt of an organic acid such as calcium linolenate stands, until this invention, most highly regarded in so far as affording heat-stability to halogen containing vinylidene resins and compositions containing these resins during "melt" state processing operations.

Even 2,2-bis-(4-glycidyloxyphenyl)-propane in combination with a metal salt of an organic acid, however, does not fully prevent halogen containing vinylidene resins and compositions thereof from deteriorating at the relatively high temperatures at which they are processed. Furthermore, 2,2-bis-(4-glycidyloxyphenyl)-propane degrades the heat distoration temperatures of halogen containing vinylidene resins and compositions thereof thus lowering the temperatures at which these materials can be processed. In addition, 2,2-bis-(4-glycidyloxyphenyl)-propane, being a tacky, viscous liquid, is extremely difficult to blend with other materials and therefore it is extremely difficult to formulate homogeneous halogen containing vinylidene resin compositions using 2,2-bis-(4-glycidyloxyphenyl)-propane.

The present invention provides for compositions of halogen containing vinylidene resins which have excellent heat-stability, impact strength and heat distortion temperatures. Consequently, the compositions of this invention can be processed at relatively high temperatures without undergoing undesirable deterioration, as previously described, and can be processed at these temperatures for longer periods of time as compared to compositions of halogen containing vinylidene resins containing such stabilizers as 2,2-bis-(4-glycidyloxyphenyl)-propane.

The compositions of this invention comprise a halogen containing vinylidene resin, a bis-(4-glycidyloxyaryl)-sulfone and a metallic salt of an organic acid wherein: the bis-(4-glycidyloxyaryl)-sulfone and the metallic salt of an organic acid are present in the compositions in an amount sufficient to heat-stabilize the compositions.

Generally, the compositions of this invention contain from about 0.1 percent by weight to about 5 percent by weight, preferably from about 0.5 percent by weight to about 2.5 percent by weight, of the bis-(4-glycidyloxyaryl)-sulfone based on the weight of the vinylidene resin; and from about 0.1 percent by weight to about 6 percent by weight, preferably from about 0.5 percent by weight to about 3 percent by weight, of a metal salt of an organic acid, based on the weight of the vinylidene resin.

The term halogen containing vinylidene resin or vinylidene halide resin as used herein is intended to encompass, among others, homopolymers of a monomer having the formula:

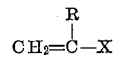

wherein X is a halogen atom, i.e., chlorine, bromine, iodine or fluorine and R is hydrogen or one of the above named halogens; and polymers of such monomers with at least one other monoethylenically unsaturated monomer wherein the polymers contain at least about 80 percent by weight

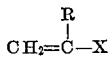

monomer polymerized therein.

Examples of such monoethylenically unsaturated monomers are the vinyl esters such as vinyl acetate, vinyl propionate, vinyl butyrate, vinyl chloroacetate, vinyl chloropropionate, vinyl benzoate, vinyl chlorobenzoate; acrylic and α-substituted acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, acrylamide, N-methyl acrylamide, N-N-dimethyl acrylamide, acrylonitrile, chloroacrylonitrile, methacrylonitrile, ethacrylonitrile; vinyl aromatic compounds such as styrene, dichlorostyrene, vinyl naphthalene; alkyl esters of maleic and fumaric acid such as dimethyl maleate, diethyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone; also vinyl pyridine, N-vinyl carbazole, N-vinyl pyrrolidene, isobutylene, ethylene, trichloroethylene, and various other monoethynically unsaturated monomers.

Illustrative of suitable bis-(4-glycidyloxyaryl)-sulfones for purposes of this invention are those having the formula:

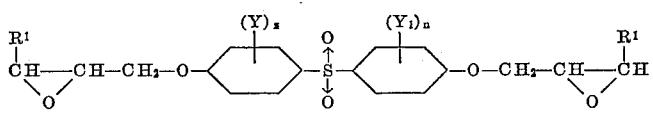

wherein each Y and each $Y_1$, which can be the same or different are alkoxy radicals, generally containing from 1 to 6 carbon atoms inclusive, preferably containing from 1 to 4 carbon atoms inclusive, as for example, methoxy, methoxyethyl, ethoxyethyl, n-butoxy, n-amyloxy and the like; or halogen, that is, chlorine, bromine, iodine or fluorine; or alkyl radicals, generally containing from 1 to 6 carbon atoms inclusive, preferably containing from 1 to 4 carbon atoms inclusive, such as methyl, ethyl, n-propyl, n-butyl, n-hexyl, and the like; and $z$ and $n$, which can be the same or different, are integers having a value of from 0 to 4 inclusive; and wherein $R^1$ is hydrogen or a methyl radical.

Among specific bis-(4-glycidyloxyaryl)-sulfones can be noted the following: bis-(4-glycidyloxyphenyl)-sulfone, bis-(3-methoxy-4-glycidyloxyphenyl)-sulfone, 3′-ethoxy-4,4′-diglycidyloxy diphenyl sulfone, 5′-ethoxy-4,4′-diglycidyloxy diphenyl sulfone, 3′-ethoxy-3-methyl-4,4′-diglycidyloxy diphenyl sulfone, 5′-methoxy-5-chloro-4,4′-diglycidyloxy diphenyl sulfone, bis-(3-chloro-4-glycidyloxyphenyl)-sulfone, 5′-chloro-4,4′-diglycidyloxy diphenyl sulfone, 5′-chloro-3′-methyl-4,4′-diglycidyloxy diphenyl sulfone, bis-(3-methyl-4-glycidyloxyphenyl)-sulfone, 5′-ethyl-4,4′-diglycidyloxy diphenyl sulfone, 3′-n-propyl-4,4′-diglycidyloxy diphenyl sulfone and the like.

Bis-(4-glycidyloxyaryl)-sufones can be conveniently prepared by epoxidizing the desired bis-(4-hydroxyaryl)-sulfone in a manner described in U.S. Patent 2,765,322 issued October 2, 1956, to E. M. Beavers.

Bis-(4-hydroxyaryl)-sulfones can be conveniently prepared according to the procedures described by Chester M. Suter, at pages 695–701 of a book entitled, "The Organic Chemistry of Sulfur," published by John Wiley & Sons, copyright 1944, which is incorporated herein by reference.

Exemplary of metal salts of organic acid which can be used in combination with the bis-(4-glycidyloxyaryl)-sulfones to formulate the compositions of this invention are those having the formula:

wherein: $R^3$ is a monovalent hydrocarbon radical and M is a metal of either the first or second group of the periodic table which is set forth on pages 310 and 311 of the Handbook of Chemistry and Physics, 30th edition.

Exemplary of suitable monovalent hydrocarbon radicals for $R^3$ are the following: alkyl radicals, generally containing from 1 to 25 carbon atoms inclusive, preferably containing from 7 to 17 carbon atoms inclusive, such as methyl, ethyl, n-propyl, n-butyl, n-hexyl, n-octyl, n-dodecyl, n-tetradecyl, and n-heptadecyl; unsaturated radicals, generally containing from 1 to 23 carbon atoms inclusive, preferably containing from 7 to 18 carbon atoms inclusive, such as oleate, ricinoleate, linoleate, licanate, vaccenate, palmitoleate, linolenate, and the like; aryl radicals generally containing from 6 to 12 carbon atoms inclusive, preferably containing from 6 to 8 carbon atoms inclusive such as phenate, naphthenate and the like; mono-hydroxy substituted aryl radicals such as p-hydroxy phenate; alkoxy substituted aryl radicals, particularly those wherein the alkoxy group contains from 1 to 6 carbon atoms inclusive such as p-methoxy phenate, p-ethoxy phenate and the like.

Exemplary of suitable metals of the first and second groups of the periodic table are sodium, potassium, magnesium, calcium, zinc, barium, cadmium, strontium and the like.

Specific metal salts of organic acids suitable for purposes of this invention are: sodium butyrate, potassium isovalerate, calcium caproate, zinc caprylicate, strontium laurate, cadmium myristate, barium palmitate, sodium stearate, potassium palmitoleate, strontium oleate, cadmium ricinoleate, calcium petroselinate, barium vaccenate, sodium linolenate, potassium eleostearate, barium licanate, sodium parinarate, and the like, as well as mixtures thereof.

The compositions of this invention are generally formulated by blending the resin, the bis-(4-glycidyloxyaryl)-sulfone, and the metal salt of an organic acid in a ribbon blender, a Hobart mixer, a paddle blender and the like at temperatures of from about 20° C. to about 90° C. and for periods of time sufficient to effect a homogeneous blending of the components.

It is preferred to conduct some stage of the blending operation at a temperature sufficient to flux the composition in order to produce a mixture of greater homogeneity. The hot-mixing can be satisfactorily conducted in a Banbury mixer, on a two-roll mill, in a compounding extruder or other such apparatus. Also, a portion of the blending operation can be combined with the forming operation, by which the compositions are formed into structures of the desired shape, as for example, by accomplishing the final blending in the barrel of the forming extruder or in the cylinder of an injection molding apparatus.

If desired, additional materials can be added to the compositions of this invention, to plasticize, to lubricate, to color, to act as fillers, and the like, in amounts as are well known in the art. In addition, other additives which are capable of reacting with any hydrogen halide which may be eliminated from the halogen containing vinylidene resins can also be added. Particularly desirable so-called hydrogen halide acceptors are the organophosphites having the formula:

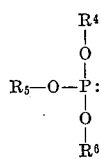

wherein $R^4$, $R^5$ and $R^6$, which can be the same or different, are alkyl radicals, generally containing from 1 to 18 carbon atoms inclusive, preferably containing from 8 to 10 carbon atoms inclusive, such as methyl, ethyl, n-propyl, n-butyl, n-hexyl, n-octyl, n-nonyl, n-decyl, n-dodecyl and the like, or aryl radicals containing from 6 to 8 carbon atoms inclusive such as phenyl, p-methylphenyl and the like.

When employed, the organophosphites, having the above noted formula, are used in amounts of from about 0.1 percent by weight to about 2 percent by weight, preferably from about 0.2 percent by weight to about 1 percent by weight, based on the weight of the halogen containing vinylidene resin.

Specific illustrations of organophosphites are trimethyl phosphite, triethyl phosphite, tri-n-propyl phosphite, tri-n-butyl phosphite, triphenyl phosphite, tri-n-octyl phosphite, n-octyl diphenyl phosphite, phenyl di-n-octyl phosphite, and the like.

The compositions of this invention, once formulated, were tested and compared to compositions which contained as the primary stabilizer 2,2-bis-(4-glycidyloxyphenyl)-propane.

The compositions of this invention and compositions, hereinafter referred to as controls, which contained 2,2-bis-(4-glycidyloxyphenyl)-propane, were subjected to the izod impact strength test and the high speed mill heat-stability test, both of which are described below.

*Izod impact test.*—500 gram samples were fluxed on a 16 inch multiple speed, two roll mill and worked thereon for 4 minutes while the temperature of the rolls was at 180° C. and while the mill was operating at a roll surface speed of 165 f.p.m. The compositions were stripped off as 0.150 inch thick sheets, pressed to 0.125 inch thick sheets in a steam heated hydraulic press, using 180 p.s.i.g. of steam, which was operating on a 6 minute press cycle. The sheets were then subjected to the procedure described in ASTM test designated as D–256–56. Results obtained were recorded in ft.-lbs. per inch notch.

*High speed mill heat stability test.*—250 gram samples were fluxed on a 16 inch multiple speed, two roll mill and worked thereon while the temperature of the rolls was at 150° C.–185° C. and while the mill was operating at a roll surface speed of 165 f.p.m. At 2-minute intervals after each composition had been worked for 1 minute, the mill was stopped and 0.125 inch thick samples about 1 inch square were removed from the hot bank of the mill by means of molding pliers. The color of each sample was then noted.

The following examples further illustrate the present invention and are not intended to limit the scope thereof in any manner.

Amounts noted in the examples are in parts by weight.

Specific viscosity measurements noted in the examples were made at 20° C. in a capillary viscometer using solutions of 100 ml. of nitrobenzene in which were dissolved 0.2 gram of resin.

EXAMPLE 1

Compositions, whose formulations are noted below, were subjected to the izod impact strength test after being preblended in a Hobart mixer at room temperature, about 23° C., for about 1 minute.

|  | A | Control 1 |
|---|---|---|
| Polyvinyl chloride having a specific viscosity of 0.140–0.150 | 65.8 | 65.8 |
| Barium-cadmium laurate | 2.5 | 2.5 |
| Octyl diphenyl phosphite | 0.5 | 0.5 |
| Bis-(4-glycidyloxyphenyl)-sulfone | 1.2 | |
| 2,2-bis-(4-glycidyloxyphenyl)-propane | | 1.2 |
| Thermoplastic resin of poly(n-hexylacrylate) grafted onto a styrenebutadiene rubber | 6.0 | 6.0 |
| Rutile titanium dioxide | 12.0 | 12.0 |
| Calcium carbonate | 4.0 | 4.0 |

The izod impact strength of composition A was over twice as great as the izod impact strength of control 1.

The thermoplastic resin, noted in this and subsequent examples, of poly(n-hexylacrylate) grafted onto a styrene-butadiene rubber was produced by grafting poly(n-hexylacrylate) onto a rubber made up of 25 percent by weight styrene and 75 percent by weight 1,3-butadiene with the resultant thermoplastic resin containing 50 percent by weight combined poly(n-hexylacrylate) and 50 percent by weight combined styrene-butadiene rubber.

The barium-cadmium laurate noted in this and subsequent examples was made up of 2 parts by weight cadmium laurate per 1 part by weight barium laurate.

EXAMPLE 2

Compositions, whose formulations are noted below were subjected to the heat stability test at 183° C., after being blended in a manner as described in Example 1.

|  | Control 2 | Control 3 | B | Control 4 | C |
|---|---|---|---|---|---|
| Polyvinyl chloride having a specific viscosity of 0.140–0.150 | 91.0 | 90.5 | 90.5 | 89.5 | 89.5 |
| Barium-cadmium laurate | 2.5 | 2.5 | 2.5 | 2.5 | 2.5 |
| Octyl diphenyl phosphite | 0.5 | 0.5 | 0.5 | 0.5 | 0.5 |
| 2,2-bis-(4-glycidyloxyphenyl)-propane | | 0.5 | | 1.5 | |
| Bis-(4-glycidyloxyphenyl)-sulfone | | | 0.5 | | 1.5 |
| Thermoplastic resin of poly (n-hexylacrylate) grafted onto a styrenebutadiene rubber | 6.0 | 6.0 | 6.0 | 6.0 | 6.0 |

*Heat stability*

*Control 2.*—This composition turned black in 7 minutes.

*Control 3.*—This composition turned black in 9 minutes.

*Control 4.*—This composition turned black in 13 minutes.

*Composition B.*—This composition turned yellow in 7 minutes and progressed to orange in 9 minutes.

*Composition C.*—This composition turned reddish-orange in 13 minutes.

EXAMPLE 3

Compositions whose formulations are noted below, were subjected to the heat stability test at 185° C., after they were blended in a manner described in Example 1.

|  | Control 5 | Control 6 | D | Control 7 | E |
|---|---|---|---|---|---|
| Polyvinyl chloride having a specific viscosity of about 0.190 | 68.7 | 68.3 | 68.3 | 66.9 | 66.9 |
| Dioctyl phthalate | 30.0 | 30.0 | 30.0 | 30.0 | 30.0 |
| Zinc stearate | 0.2 | 0.2 | 0.2 | 0.2 | 0.2 |
| Strontium-zinc laurate | 0.2 | 0.2 | 0.2 | 0.2 | 0.2 |
| Calcium stearate | 0.2 | 0.2 | 0.2 | 0.2 | 0.2 |
| Tricotyl phosphite | 0.7 | 0.7 | 0.7 | 0.7 | 0.7 |
| 2,2-bis-(4-glycidyloxyphenyl) propane | | 0.4 | | 1.8 | |
| Bis-(4-glycidyloxyphenyl)-sulfone | | | 0.4 | | 1.8 |

Heat stability

*Control 5.*—This composition turned black in 5 minutes.

*Control 6.*—This composition turned black in 7 minutes.

*Control 7.*—This composition turned yellow in 5 minutes.

*Composition D.*—This composition did not change color in 7 minutes. Retained its original appearance.

*Composition E.*—This composition did not change color in 9 minutes. Retained its original appearance.

The strontium-zinc laurate noted in this example was made up of 2.2 parts by weight strontium laurate per 1 part by weight zinc laurate.

EXAMPLE 4

Compositions whose formulations are noted below were subjected to the heat stability test at 180° C., after being blended in a manner described in Example 1.

|  | Control 8 | Control 9 | F |
|---|---|---|---|
| Vinyl chloride-vinyl acetate copolymer containing about 97 percent by weight vinyl chloride polymerized therein and having a specific viscosity of about 0.210 | 68.7 | 67.9 | 67.9 |
| Dioctyl phthalate | 30.0 | 30.0 | 30.0 |
| Barium-zinc-cadmium salt | 0.8 | 0.8 | 0.8 |
| Octyl diphenyl phosphite | 0.5 | 0.5 | 0.5 |
| 2,2-bis-(4-glycidyloxyphenyl)-propane | | 0.8 | |
| Bis-(4-glycidyloxyphenyl)-sulfone | | | 0.8 |

Heat stability

*Control 8.*—This composition truned orange in 9 minutes.

*Control 9.*—This composition turned orange in 13 minutes.

*Composition F.*—This composition turned light yellow in 9 minutes, progressed to yellow in 13 minutes, and turned orange in 21 minutes.

Barium-zinc-strontium salt noted in this example was made up by weight of 60 parts by weight of the barium salt of p-octylphenol, 30 parts by weight of the cadmium salt of n-octanoic acid, and 10 parts by weight of the zinc salt of n-octanoic acid.

EXAMPLE 5

Compositions, whose formulations are noted below, were subjected to the heat stability test at 151° C., after being blended in a manner described in Example 1.

|  | Control 10 | Control 11 | G | Control 12 | H |
|---|---|---|---|---|---|
| Vinyl chloride-vinyl acetate copolymer containing about 89 percent by weight combined vinyl chloride and having a specific viscosity of about 0.150 | 98.5 | 98.0 | 98.0 | 96.5 | 96.5 |
| Barium-cadmium laurate | 0.4 | 0.4 | 0.4 | 0.4 | 0.4 |
| Calcium stearate | 0.2 | 0.2 | 0.2 | 0.2 | 0.2 |
| Strontium laurate | 0.2 | 0.2 | 0.2 | 0.2 | 0.2 |
| Octyl diphenyl phosphite | 0.7 | 0.7 | 0.7 | 0.7 | 0.7 |
| 2,2-bis-(4-glycidyloxyphenyl)-propane | | 0.5 | | 2.0 | |
| Bis-(4-glycidyloxyphenyl)-sulfone | | | 0.5 | | 2.0 |

Heat stability

*Control 10.*—This composition turned black in 7 minutes.

*Control 11.*—This composition turned black in 9 minutes.

*Control 12.*—This composition turned yellow in 9 minutes and progressed to brown in 17 minutes.

*Composition G.*—This composition turned orange in 7 minutes and progressed to light brown in 9 minutes.

*Composition H.*—This composition turned yellow in 9 minutes and progressed to brown in 21 minutes.

EXAMPLE 6

Compositions, whose formulations are noted below, were subjected to the heat stability test at 180° C., after being blended in a manner described in Example 1.

|  | Control 13 | Control 14 | I |
|---|---|---|---|
| Polyvinyl chloride having a specific viscosity of about 0.120 | 97.5 | 95.5 | 95.5 |
| Barium-cadmium laurate | 2.5 | 2.5 | 2.5 |
| 2,2-bis-(4-glycidyloxyphenyl)-propane | | 2.0 | |
| Bis-(4-glycidyloxyphenyl)-sulfone | | | 2.0 |

Teat stability

*Control 13.*—This composition turned black in 7 minutes.

*Control 14.*—This composition turned black in 9 minutes.

*Composition I.*—This composition turned orange in 9 minutes.

What is claimed is:

1. A composition comprising a vinylidene halide resin, bis-(4-glycidyloxyphenyl)-sulfone, and a mixture of metal salts of organic acids, said metal salts having the formula:

$$R^3COOM$$

wherein $R^3$ is a monovalent hydrocarbon radical and M is a member selected from the group consisting of metals of the first and second groups of the periodic table, said sulfone and said metal salts being present in said composition in an amount sufficient to heat-stabilize said composition.

2. A composition as defined in claim 1 wherein $R^3$ is an alkyl radical.

3. A composition comprising a vinylidene halide resin, bis-(4-glycidyloxyphenyl)-sulfone in an amount of from about 0.1 percent by weight to about 5 percent by weight, based on the weight of the said vinylidene resin, and a mixture of metal salts of organic acids, said metal salts having the formula:

$$R^3COOM$$

wherein $R^3$ is a monovalent hydrocarbon radical and M is a member selected from the group consisting of metals of the first and second groups of the periodic table, said metal salts being present in said composition in an amount of from about 0.1 percent by weight to about 6 percent by weight, based on the weight of said vinylidene resin.

4. A composition as defined in claim 1 wherein the said vinylidene resin is polyvinyl chloride.

5. A composition as defined in claim 1 wherein the vinylidene resin is a copolymer of vinyl chloride and vinyl acetate.

6. A composition as defined in claim 1 wherein the metal salts are a mixture of barium laurate and cadmium laurate.

7. A composition as defined in claim 1 wherein the metal salts are a mixture of zinc stearate, strontium laurate, zinc laurate and calcium stearate.

8. A composition as defined in claim 1 wherein the metal salts are a mixture of cadmium octanoate and zinc octanoate.

9. A composition as defined in claim 1 wherein the metal salts are a mixture of barium laurate, cadmium laurate, calcium stearate and strontium laurate.

10. A composition as defined in claim 1 containing an organophosphite having the formula:

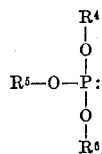

wherein R⁴, R⁵ and R⁶ are members selected from the group consisting of alkyl and aryl radicals.

11. A composition as defined in claim 10 wherein said organophosphite is present in said composition in an amount of from about 0.1 percent by weight to about 2 percent by weight, based on the weight of said vinylidene resin.

12. A composition as defined in claim 10 wherein said organophosphite is present in said composition in an amount of from about 0.2 percent by weight to about 1 percent by weight, based on the weight of said vinylidene resin.

13. A composition as defined in claim 11 wherein the organophosphite is octyl diphenyl phosphite.

14. A composition as defined in claim 11 wherein the organophosphite is trioctyl phosphite.

15. A composition as defined in claim 1 wherein said sulfone is present in an amount of about 0.5 percent by weight to about 2.5 percent by weight and said mixture of metal salts is present in an amount of about 0.5 percent by weight to about 3 percent by weight.

References Cited by the Examiner

UNITED STATES PATENTS

| | | | |
|---|---|---|---|
| 2,564,646 | 8/1951 | Leistner et al. | 260—45.75 |
| 2,765,322 | 10/1956 | Beavers | 260—47 XR |
| 2,894,923 | 7/1959 | Graham | 260—45.75 XR |
| 2,953,537 | 9/1960 | McBrien | 260—23 |
| 3,071,560 | 1/1963 | Fetscher et al. | 260—23 |

LEON J. BERCOVITZ, *Primary Examiner.*

MILTON STERMAN, *Examiner.*

T. D. KERWIN, R. A. WHITE, *Assistant Examiners.*